(12) United States Patent
Kang et al.

(10) Patent No.: US 9,258,766 B2
(45) Date of Patent: Feb. 9, 2016

(54) APPARATUS FOR POINT-TO-MULTI POINT COMMUNICATION IN COMMUNICATION SYSTEM AND METHOD THEREOF

(71) Applicant: Samsung Electronics Co. Ltd., Suwon-si, Gyeonggi-do (KR)

(72) Inventors: Hyun-Jeong Kang, Seoul (KR); Rakesh Taori, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 13/904,441

(22) Filed: May 29, 2013

(65) Prior Publication Data

US 2013/0322293 A1    Dec. 5, 2013

(30) Foreign Application Priority Data

May 31, 2012    (KR) .......................... 10-2012-0058849

(51) Int. Cl.
*H04W 48/16*    (2009.01)
*H04W 92/20*    (2009.01)

(52) U.S. Cl.
CPC ............... *H04W 48/16* (2013.01); *H04W 92/20* (2013.01)

(58) Field of Classification Search
CPC .................................................... H04W 48/16
USPC .......................................................... 370/254
See application file for complete search history.

(56) References Cited

U.S. PATENT DOCUMENTS

| | | | |
|---|---|---|---|
| 7,336,670 B1 * | 2/2008 | Calhoun et al. ............... | 370/401 |
| 2004/0001442 A1 | 1/2004 | Rayment et al. | |
| 2004/0137924 A1 | 7/2004 | Herscovich et al. | |
| 2008/0080364 A1 | 4/2008 | Barak et al. | |
| 2008/0090575 A1 | 4/2008 | Barak et al. | |
| 2009/0323621 A1 | 12/2009 | Touboul et al. | |
| 2010/0008347 A1 * | 1/2010 | Qin et al. ....................... | 370/345 |
| 2010/0105419 A1 | 4/2010 | Kim et al. | |
| 2010/0110983 A1 | 5/2010 | Fu | |
| 2011/0038308 A1 | 2/2011 | Song et al. | |
| 2011/0194420 A1 | 8/2011 | Park et al. | |

* cited by examiner

*Primary Examiner* — Dang Ton
*Assistant Examiner* — Mewale Ambaye
(74) *Attorney, Agent, or Firm* — Jefferson IP Law, LLP

(57) ABSTRACT

An apparatus and a method for performing a point-to-multi point communication in a communication system are provided. The apparatus includes a base station configured to receive and transmit at least one of data on a mobile station, control information of the mobile station, schedule information on the mobile station, and control information on a communication link with at least one base station with respect to at least one base station in which a communication link is not set up through a core network. The base station services at least one mobile station at the same time together with a base station in which a communication link is set up through a core network.

16 Claims, 18 Drawing Sheets

APPARATUS FOR POINT-TO-MULTI POINT COMMUNICATION IN COMMUNICATION SYSTEM AND METHOD THEREOF

PRIORITY

This application claims the benefit under 35 U.S.C. §119 (a) of a Korean patent application filed on May 31, 2012 in the Korean Intellectual Property Office and assigned Serial No. 10-2012-0058849, the entire disclosure of which is hereby incorporated by reference.

BACKGROUND OF THE INVENTION

1. Field of the Invention

The present invention relates to an apparatus and a method of performing a point-to-multi point communication in a communication system. More particularly, the present invention relates to an apparatus and a method of performing a point-to-multi point communication among a plurality of base stations.

2. Description of the Related Art

In a communication system, a base station and a base station, or a base station and a gateway can be connected point-to-point through a core network, and the connection requires much hardware.

FIG. 1 is a diagram illustrating a connection between base stations point-to-point in a communication system according to the related art.

With reference to FIG. 1, each of the base stations may be connected through a backhaul link in a communication system 10. Herein, the backhaul link refers to a link between one base station and another point-to-point through a core network. For example, a Base Station 1 (BS1) and a BS11 can be connected through a backhaul link. If the two base stations are connected point-to-point, each of the base stations may use different hardware. In this case, in order to connect the BS1 with the other eighteen base stations 2 to 19 in a 3-tier, the BS1 needs 18 items of hardware.

Accordingly, if a base station is connected to another base station through a backhaul link, hardware requirements excessively increase.

Therefore, a need exists for an apparatus and a method that can perform a point-to-multi point communication in a communication system among a plurality of base stations.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method that can perform a point-to-multi point communication in a communication system.

Another aspect of the present invention is to provide an apparatus and a method that can perform a point-to-multi point communication through or without a core network.

Another aspect of the present invention is to provide an apparatus and a method that can effectively perform a point-to-multi point communication by adaptively changing a communication link according to the communication state.

Another aspect of the present invention is to provide an apparatus and a method in which a plurality of base stations can service a mobile station at the same time.

In accordance with an aspect of the present invention, a method of detecting a neighboring base station by a base station in a communication system is provided. The method includes receiving a discovery preamble transmitted from a transmission window section of the neighboring base station in a scanning window section, determining a start time of a response window section corresponding to a listening window section using section information on the listening window section of the neighboring base station included in the received discovery preamble, transmitting an access request with respect to the received discovery preamble from the response window section to the neighboring base station according to the determined start time, and receiving an access confirmation with respect to the access request transmitted from the neighboring base station.

In accordance with another aspect of the present invention, a base station for detecting a neighboring base station in a communication system is provided. The base station includes a communication unit configured to receive a discovery preamble from the neighboring base station in a scanning window section, transmit an access request with respect to the discovery preamble from the response window section to the neighboring base station, and receive an access confirmation with respect to the access request in a scanning window section next to the scanning window section, and a controller configured to determine the scanning window section, the response window section, and the next scanning window section by controlling the communication unit, wherein the controller determines a start time of a response window section corresponding to a listening window section using section information on the listening window section of the neighboring base station included in the received discovery preamble, determines the response window section to transmit the discovery preamble to the neighboring base station from the response window section according to the determined start time, and controls the scanning window section to receive an access confirmation with respect to the access request transmitted from the neighboring base station.

Another aspect of the present invention is to provide an effective service by a plurality of base stations providing services to a mobile station through or without a core network.

In addition, since the present invention does not require excessive hardware requirements for a point-to-multi point communication, services may be provided dynamically or adaptively according to the communication state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
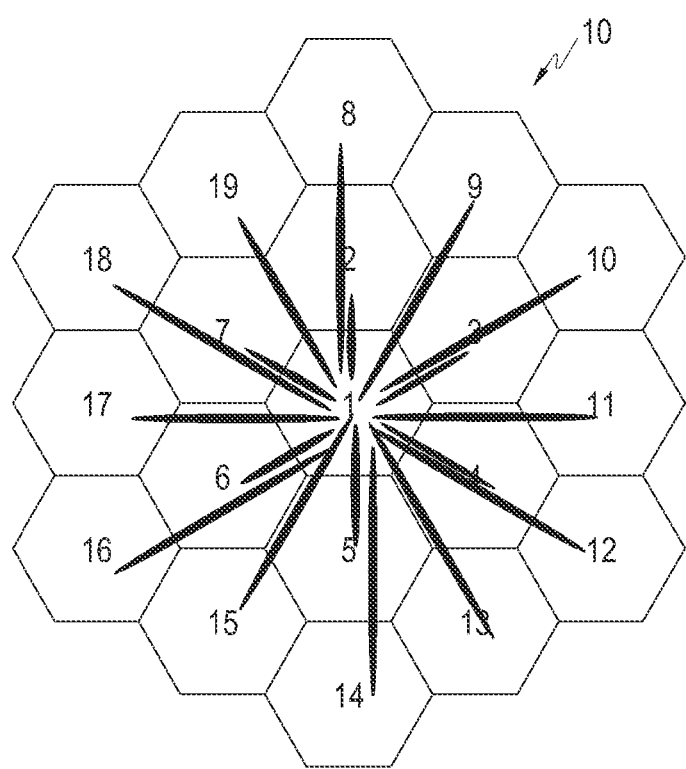
FIG. 1 is a diagram illustrating a connection between base stations point-to-point in a communication system according to the related art.
Figure 2:
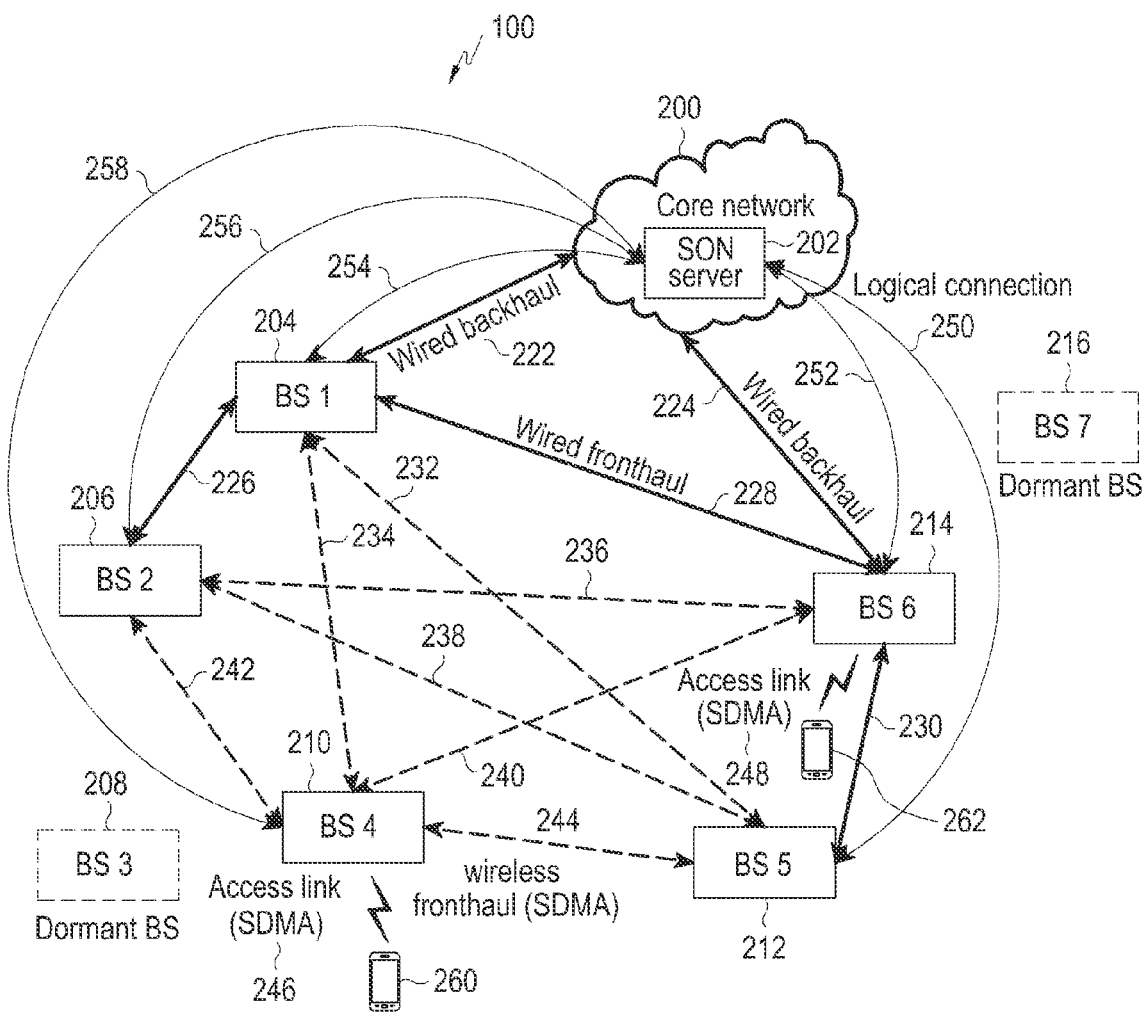
FIG. 2 is a diagram illustrating a communication system according to an exemplary embodiment of the present invention.

FIG. 2 is a diagram illustrating a communication system according to an exemplary embodiment of the present invention.

Referring to FIG. 2, a communication system 100 may include a Base Station 1 (BS1) 204, a BS2 206, a BS3 208, a BS4 210, a BS5 212, a BS6 214, a BS7 216, a Mobile Station 1 (MS1) 260, an MS2 262, and a Self Organizing Network (SON) server 202. The SON server 202 is positioned in a core network 200, and stores information on each BS (that is, BSs 204 to 216). Examples of the information may be setup information, position information, status information of each base station, or the like. Herein, the status information includes whether each BS is in an active mode or a dormant mode. In FIG. 2, the BS3 208 and the BS7 216 illustrated with a dashed box are in dormant modes, and the other BSs (that is, the BSs 204, 206, 210, 212, and 214) are in active modes.

Each base station (that is, the BSs 204 to 216) knows information on the SON server 202, such as an address of the SON server 202, and each of the BSs 204, 206, 210, 212, and 214 which are in active modes sets up logical connections 250, 252, 254, 256, and 258 with the SON server 202. In this manner, each of the BSs 204 to 216 may be provided with information required for a fronthaul communication between base stations or information required for a communication with the MS from the SON server 202. Here, the fronthaul communication refers to a direct communication between base stations without being connected through a core network.

FIG. 2 illustrates a connection status among each of the base stations 204 to 216. In FIG. 2, the BS1 204 and the BS6 214 are connected to the core network 200 through wired backhaul links 222 and 224. The BS2 206, the BS3 208, the BS4 210, the BS5 212, and the BS7 216 do not set up wired backhaul links with the core network 200. Moreover, the BS5 212 and the BS6 214 are connected by wire to set up a wired backhaul link 230. In addition, for fronthaul communications among each of the BSs 204 to 216, links among the base station can be connected wirelessly or by wire. For example, the BS1 204 and the BS2 206, the BS1 204 and the BS6 214, and the BS5 212 and the BS6 214 are connected by wire to set up wired fronthaul links 226 and 228, and the BS1 204 and the BS4 210 are connected wirelessly to set up a wireless fronthaul link 234. For a better understanding, in FIG. 2, wired connections are illustrated with bidirectional arrows, and wireless connections are illustrated with dashed bidirectional arrows. Herein, the access link may refer to a link between an MS and a base station.

Each of the BSs 204 to 216 may operate antenna arrays and Radio Frequency (RF) chains in a smaller number than the number of wireless fronthaul links among base stations. The wireless fronthaul links 232, 234, 236, 238, 240, 242, and 244 and wireless access links 246 and 248 may operate in different channel bands or the same channel band. At this point, if the wireless fronthaul links 232, 234, 236, 238, 240, 242, and 244 and the wireless access links 246 and 248 operate in the same channel band, the wireless fronthaul links 232, 234, 236, 238, 240, 242, and 244 and the wireless access links 246 and 248 may use resources according to a Space Division Multiple Access (SDMA) scheme.

Meanwhile, if base stations that do not have wired backhauls, such as the BS2 206, the BS4 210, and the BS5 212 operate, wireless backhaul links, a wireless backhaul link may operate in the same channel band with a wireless fronthaul link and an access link in an exemplary embodiment, or a wireless backhaul link and a wireless fronthaul link operate in the same channel band while an access link operates in a different channel band in another exemplary embodiment. Otherwise, according to another exemplary embodiment, a wireless fronthaul link and an access link operate in the same access band, while a wireless backhaul link operates in a different channel band. Otherwise, according to another exemplary embodiment, a wireless backhaul link and an access link operate in the same channel, while a wireless fronthaul link operates in a different channel band. Otherwise, according to another exemplary embodiment, a wireless fronthaul link, an access link, and a wireless backhaul link may operate in different channel bands, respectively. Otherwise, according to another exemplary embodiment, a wireless fronthaul link, an access link, and a wireless backhaul link may operate with separate hardware.

Figure 3:
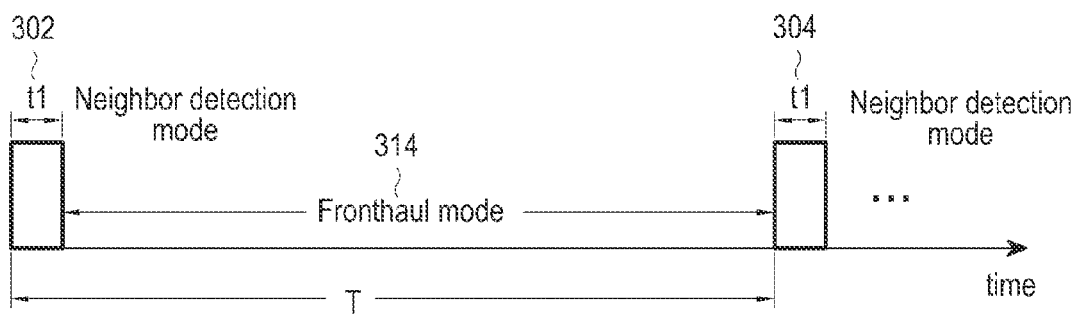
FIG. 3 is a diagram illustrating a fronthaul setup operation in a communication system according to an exemplary embodiment of the present invention.

FIG. 3 is a diagram illustrating a fronthaul setup operation in a communication system according to an exemplary embodiment of the present invention.

Referring to FIG. 3, T 300 is a period in which a neighboring base station detection section generates, and t1 302 and t1 304 correspond to neighboring base station detection sections. The T 300 and the t1 302 and t1 304 can be set up and the t1 302 and t1 304 can be set up with a short time not to exceed 0.1% of the T 300. In addition, in the t1 302 and t1 304, all the base stations operate at the same time, and base stations operate by a staggered scheme.

A base station performs a neighboring base station detection operation in the t1 302 and t1 304, and the base station transmits and receives scheduling information, MS control information, or the like, in a section 314 until the next t1 304 to/from neighboring base station detected in the t1 302 and t1 304 to perform a fronthaul link setup operation or perform a communication with a neighboring base station that already has set up the fronthaul link. In the t1 302 and t1 304, an operation may be performed according to the instruction of an SON server, or an operation may be performed by continuously assigning a certain period of time in a base station that already has set up a fronthaul link. The latter operation may be used when a base station that newly sets up a fronthaul link does not have a backhaul link.

Figure 4A:
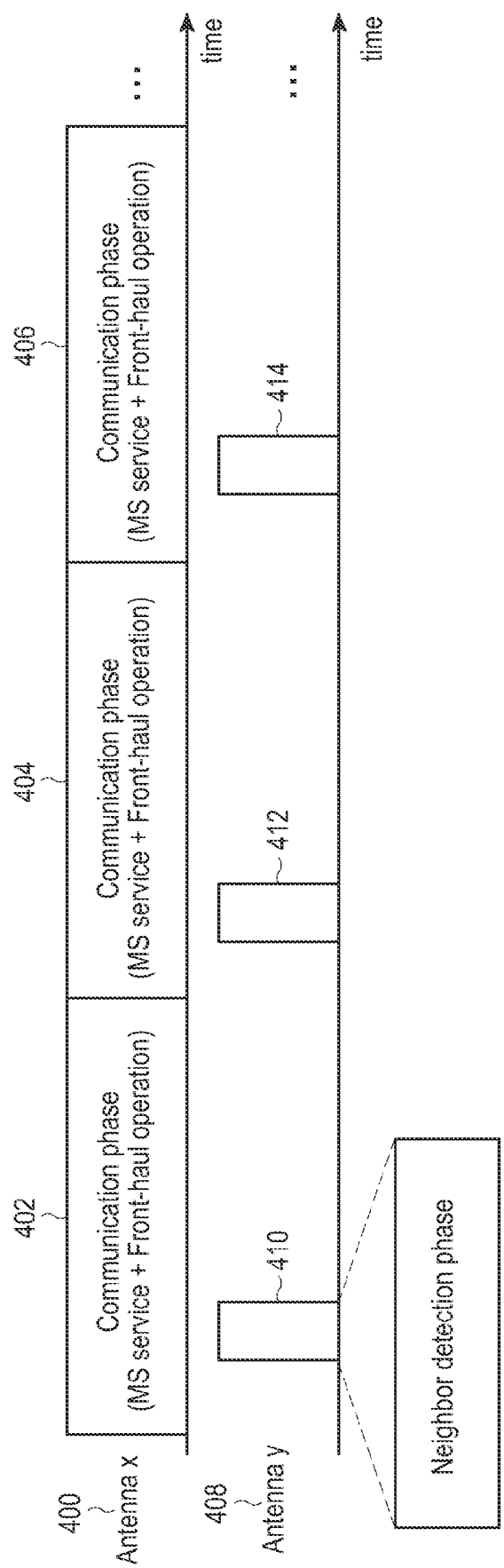
FIGS. 4A and 4B are diagrams illustrating hardware resource usage for neighboring base station detection when setting up a fronthaul link in a communication system according to an exemplary embodiment of the present invention.
Figure 4B:
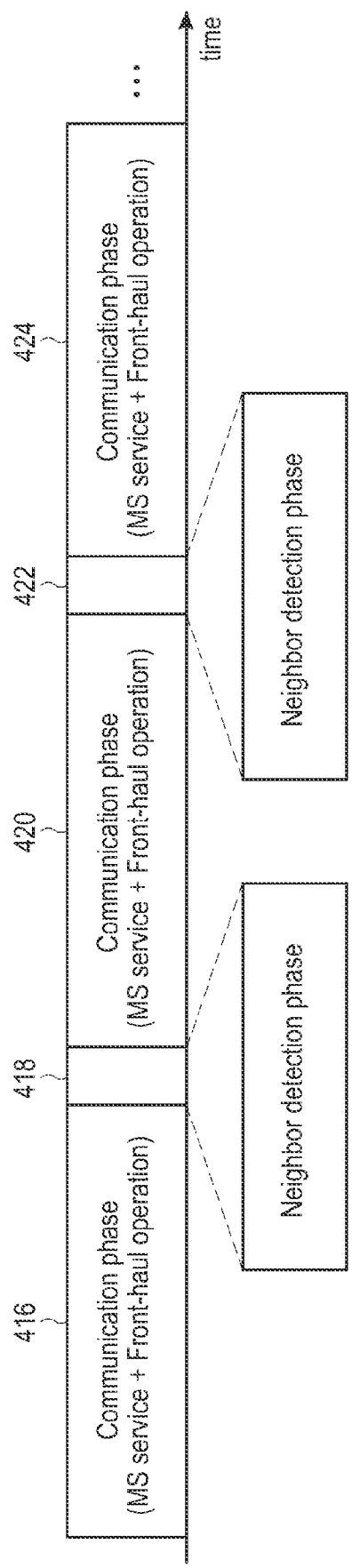

FIGS. 4A and 4B are diagrams illustrating hardware resource usage for neighboring base station detection when setting up a fronthaul link in a communication system according to an exemplary embodiment of the present invention.

Referring to FIG. 4A, it illustrates a case where a base station that desires to set up a fronthaul link uses different hardware resources for a specific communication, such as a neighboring base station detection operation, a communication with an MS, a fronthaul link setup, or a fronthaul communication and a case where the base station uses a dedicated antenna or a dedicated antenna array for a neighboring base station detection operation. For example, an antenna x 400 is used for a specific communication in sections 402, 404, and 406, and an antenna y 408 may be used for neighboring base station detection in sections 410, 412, and 414. The neighboring base station detection sections 410, 412, and 414 correspond to the t1 302 and t1 304 in FIG. 3.

Referring to FIG. 4B, it illustrates a case where the same hardware resource is used for a specific communication, such as a neighboring base station detection operation, a communication with an MS, a fronthaul link setup, and a fronthaul communication. For example, a specific communication for a neighboring base station detection operation in sections 418 and 422, a specific communication for a fronthaul link setup in sections 416, 420, and 424, or the like, may be performed in a multiplexing scheme by using the same antenna.

Figure 5A:
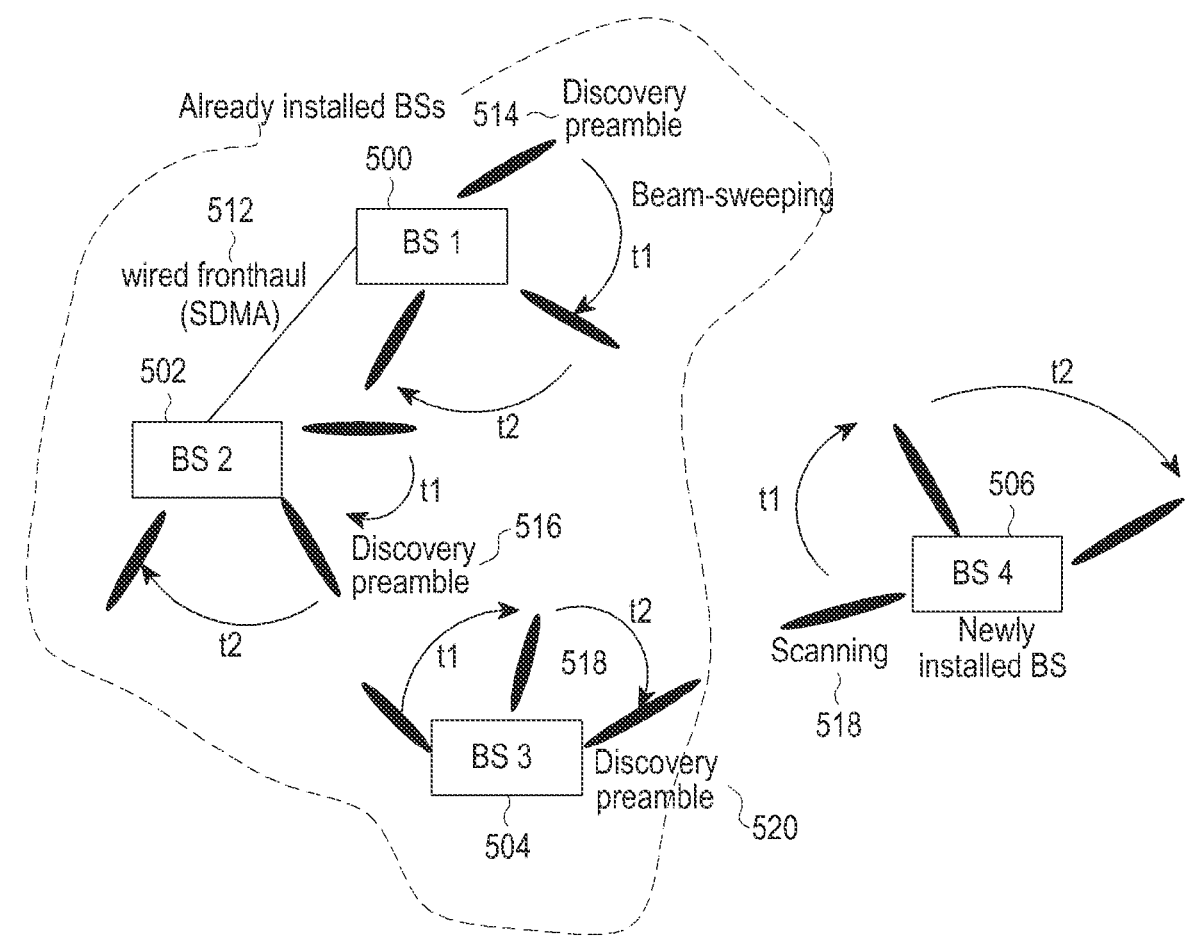
FIGS. 5A and 5B are diagrams illustrating antenna operating schemes when a neighboring base station is detected for a fronthaul setup in a communication system according to an exemplary embodiment of the present invention.
Figure 5B:
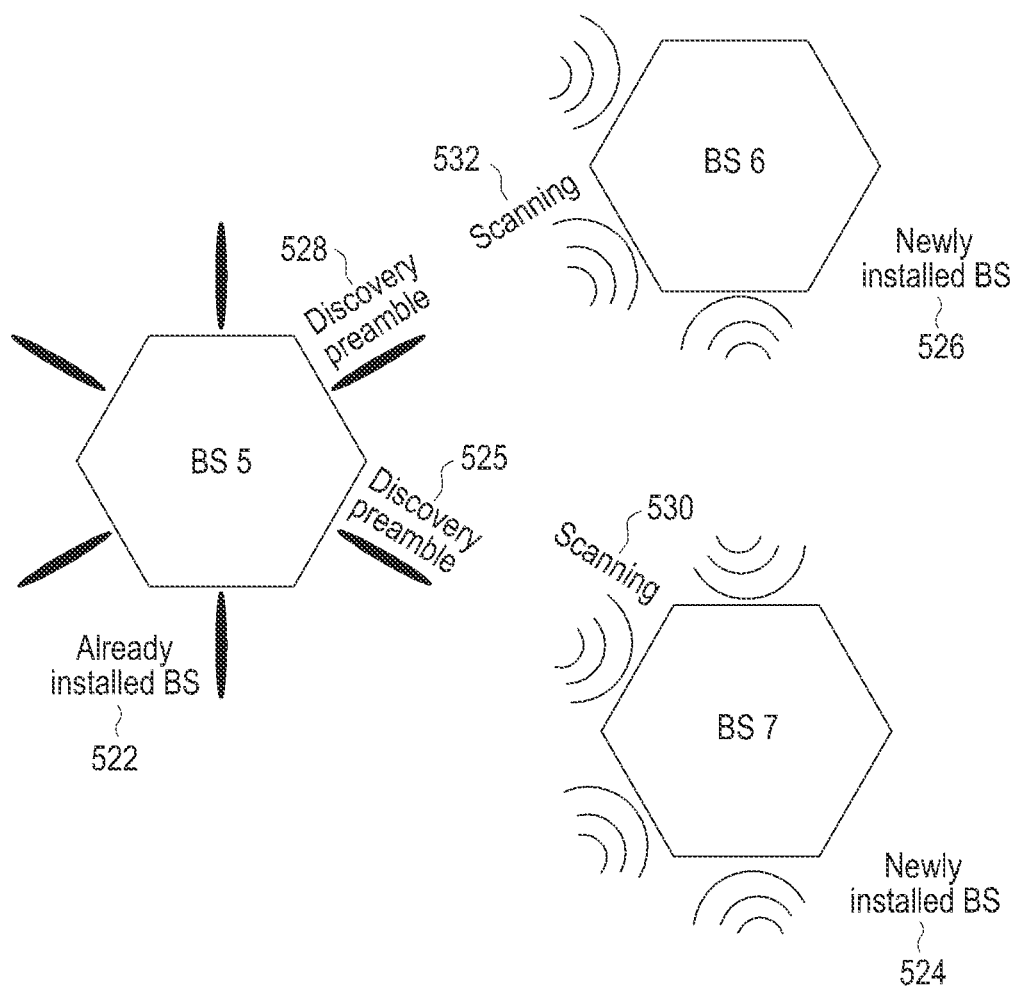

FIGS. 5A and 5B are diagrams illustrating antenna operating schemes when a neighboring base station is detected for a fronthaul setup in a communication system according to an exemplary embodiment of the present invention.

Referring to FIGS. 5A and 5B, a BS1 500, a BS2 502, and a BS3 504 in FIG. 5A and a BS5 522 in FIG. 5B are base stations that already have set up fronthaul links (i.e., wired fronthaul link 512), and a BS4 506 in FIG. 5A and a BS6 526 and a BS7 524 in FIG. 5B are base stations that newly set up fronthaul links.

In addition, FIG. 5A illustrates an exemplary embodiment of the present invention when the BS1 500, the BS2 502, and the BS3 504 may not form antenna beams in every direction, and FIG. 5B illustrates another exemplary embodiment of the present invention when the BS5 522 may form antenna beams in every direction.

With reference to FIG. 5A, the BS1 500, the BS2 502, and the BS3 504 transmit a discovery preamble for setting up a fronthaul link with the BS4 506, and the BS4 506 detects discovery preambles transmitted from the BS1 500, the BS2 502, and the BS3 504. At this point, since the BS1 500, the BS2 502, and the BS3 504 may not form antenna beams in every direction, the BS1 500, the BS2 502, and the BS3 504 transmit discovery preambles by switching antenna beams 514, 516, and 518, and the BS4 506 detects discovery preambles by switching an antenna beam 520.

Meanwhile, since the BS5 522 that already has set up a fronthaul link may form an antenna beam in every direction, the BS5 522 transmits discovery preambles through antenna beams 528 and 525 formed in every direction, and a BS6 526 and a BS7 524 detect discovery preambles through antenna beams 532 and 530 formed in every direction.

The discovery preambles may be arbitrarily selected to be used in a detection section with respect to neighboring base stations or may be allocated for a base station that transmits discovery preambles. The allocation process of the discovery preambles for each base station may be performed in a SON server. Since the discovery preamble is to be used as information for identifying base stations, coordination among base stations or between a base station and an SON server is to be performed so that neighboring base stations select different discovery preambles. The base stations that already have installed fronthaul links transmit discovery preambles at the same time in a transmission window section of a discovery preamble. However, if the transmission window sections of the discovery preambles are used in a divided manner among neighboring base stations, the discovery preambles are transmitted when the discovery preambles are allocated to each base station. The information on the transmission scheme of the discovery preamble may be received from the SON server or may be set up in advance at the time of realizing the base station.

In addition, the discovery preamble may include an operator identifier of the base station in which the fronthaul is predefined in advance, an identifier of a base station, a beam identifier, a section information of a listening window followed by a transmission window section of the discovery preamble, a resource allocation information to transmit an access request on a discovery preamble, or the like. Here, the section information on the listening window section may include start time information (hereinafter referred to as a start time) of a listening window section, length information of a listening window section, or the like. When the base station configured to receive the discovery preambles detects one or more base stations that transmit discovery preambles, the listening section like this may transmit access requests to the one or more base stations. For example, a setup can be performed so that a listening section is not overlapped among base stations or a setup can be performed in a listening section of a sufficient length so that access confirmations can be transmitted to various neighboring base stations in the same listening sections. The coordination on the listening window section is performed among base stations or between a base station and an SON server. For example, the section length of the listening window section may be adjusted based on the number of base stations identified using a rule or a table predefined for identifying the number of base stations that transmit discovery preambles and adjusting a section length of a listening window section. In this manner, the scanning window section and the response window section may operate in the same manner as the listening window section operates.

Figure 6A:
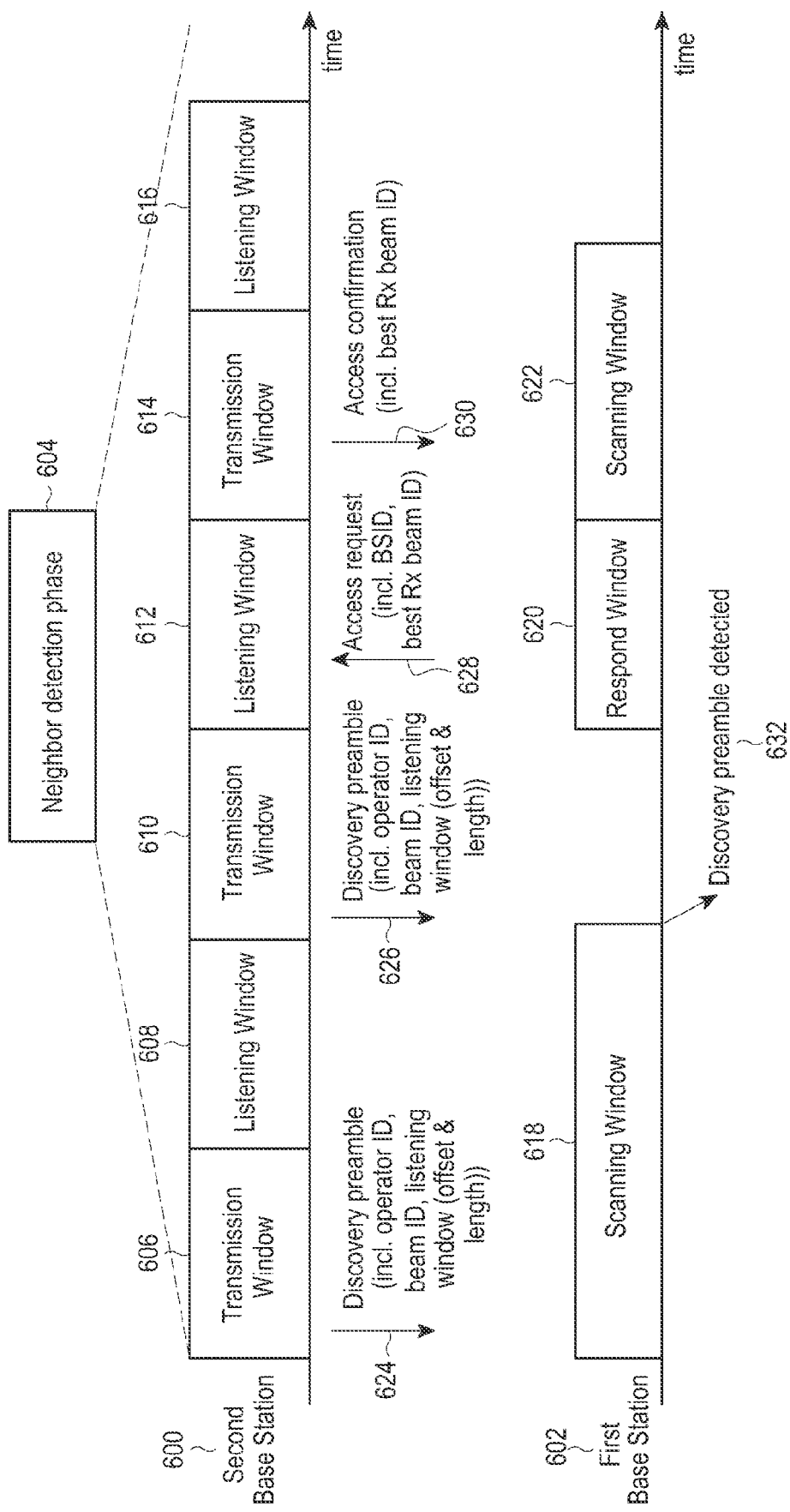
FIGS. 6A through 6C are diagrams illustrating methods of determining response timing if a base station that newly sets up a fronthaul link detects a neighboring base station in a communication system according to an exemplary embodiment of the present invention.
Figure 6B:
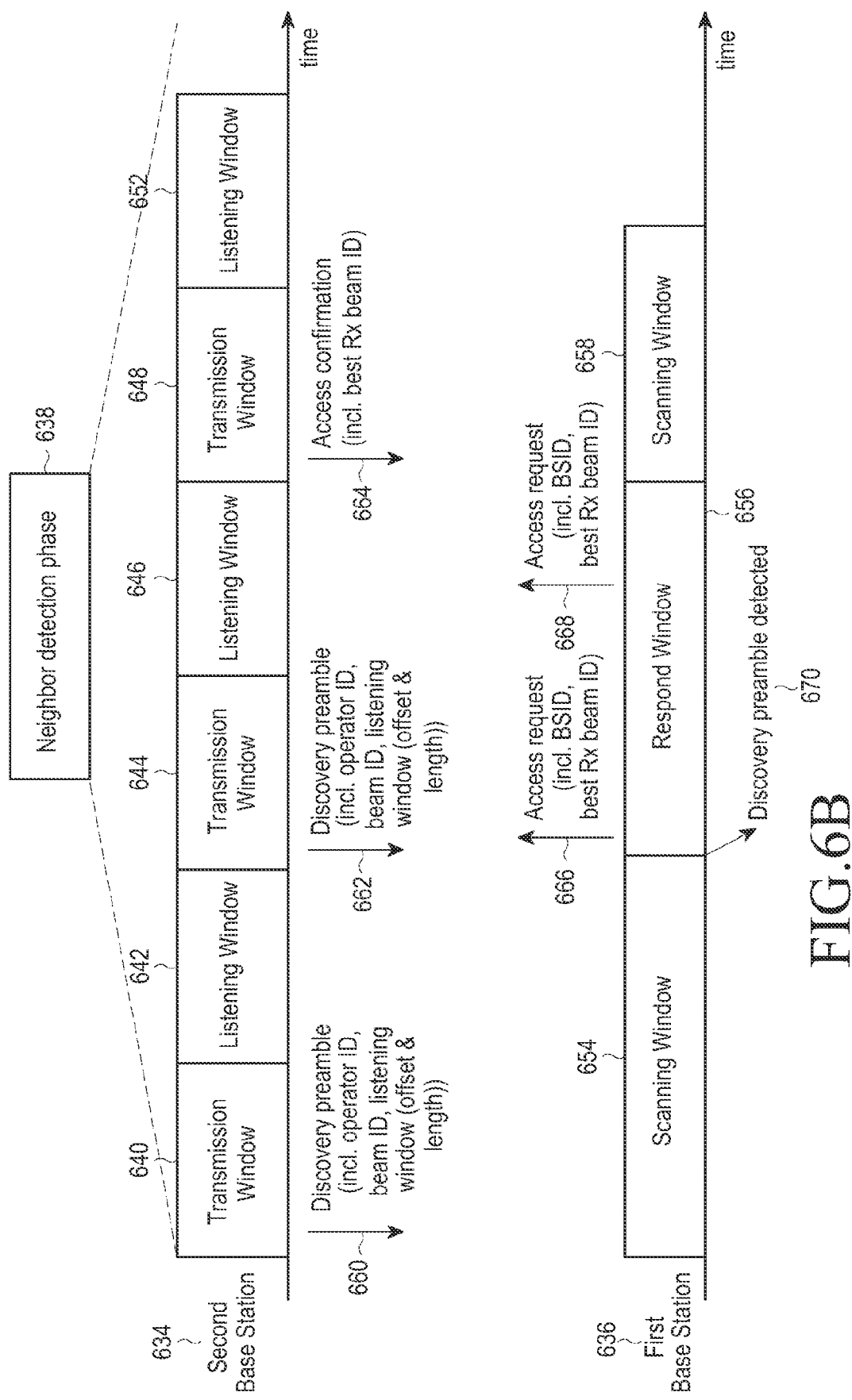
Figure 6C:
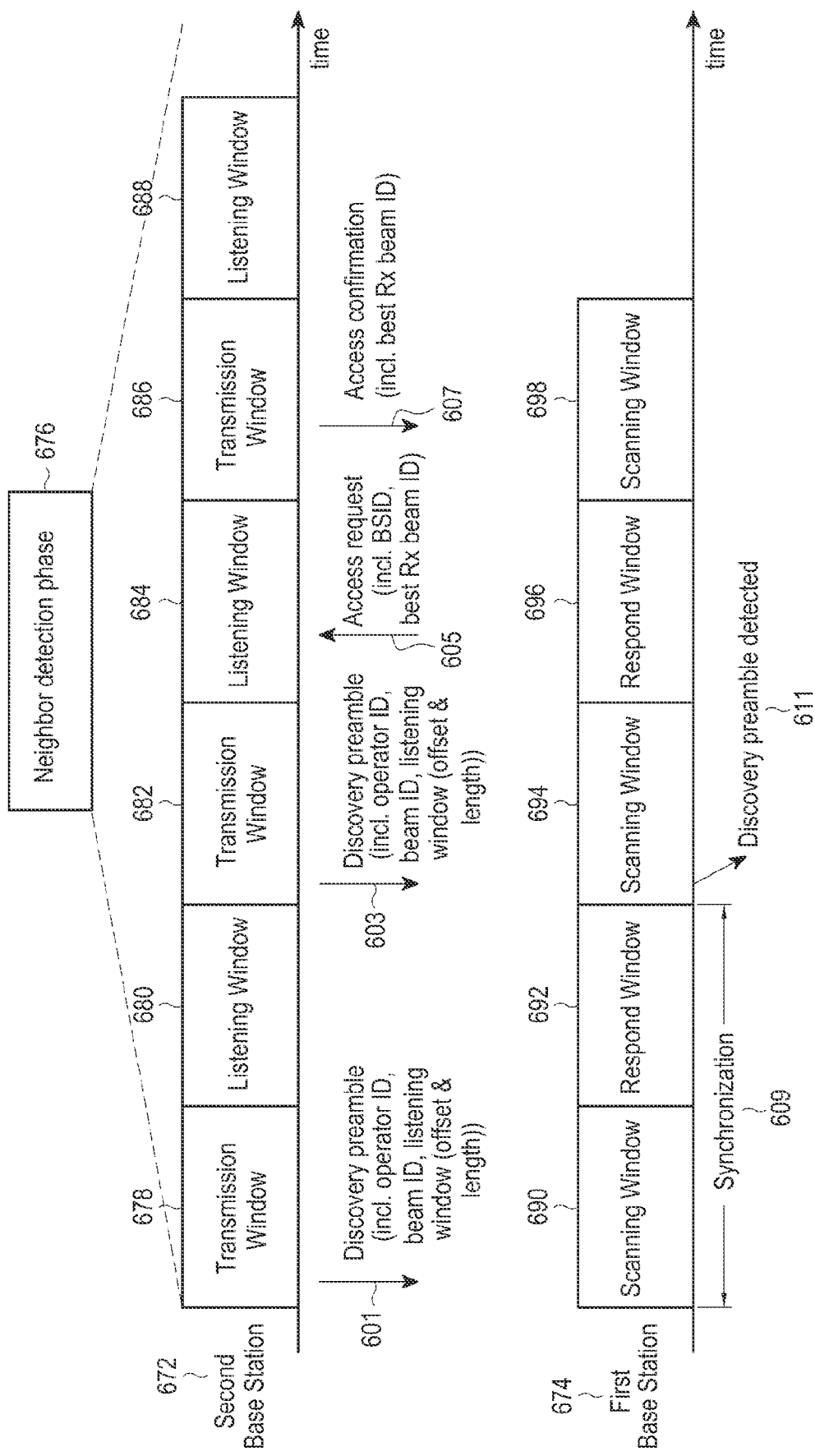

FIGS. 6A through 6C are diagrams illustrating methods of determining response timing if a base station that newly sets up a fronthaul link detects a neighboring base station in a communication system according to an exemplary embodiment of the present invention.

Hereinafter, a base station that newly sets up a fronthaul link is described as a first base station, and a base station that already has set up a fronthaul link is described as a second base station.

Further, a transmission window, a listening window, a scanning window, and a response window mentioned below are defined as sections for performing operations in a time axis.

Referring to FIG. 6A, if a first base station 602 receives a discovery preamble transmitted from a second base station 600 at a scanning window 618, and is provided with time information of transmitting an access request for received discovery preambles (hereinafter referred to as an "access request"), that is, information on listening windows 608, 612, and 616 of the second base station 600, from the second base station 600, the first base station 602 transmits an access request in accordance with the listening windows 608, 612, and 616 of the second base station 600.

More specifically, in a neighbor detection phase 604, the second base station 600 operates transmission windows 606, 610, and 614 and the listening windows 608, 612, and 616 according to a multiplexing scheme. In the transmission windows 606, 610, and 614, the second base station 600 transmits discovery preambles 624 and 626 for detecting the first base station 602, or transmits an access confirmation to the first base station 602 that has transmitted an access request (630). Further, in the listening windows 608, 612, and 616, the second base station 600 receives an access request on discovery preambles transmitted by the first base station 602 (628). At this point, the discovery preamble may include an operator IDentification (ID) of the second base station 600, a BS ID of the second base station 600, a beam ID, a start time of the listening window, and length information, and the access request may include a BS ID of the first base station, a best Rx beam ID of the second base station, and the like. Further, the access confirmation may include a best Rx beam ID of the first base station.

The first base station 602 receives the discovery preamble 626 or the access confirmation 630 transmitted from the second base station 600 at the scanning windows 618 and 622 (626 and 630), and transmits an access request 628 for discovery preambles transmitted from the second base station 600, at a response window 620.

The operation at the scanning window 618 repeats until the first base station 602 receives a discovery preamble. Further, if a discovery preamble is received at the scanning window 618, the first base station 602 uses information on the listening window 612 of the second base station 600 included in the discovery preamble to determine a start time of the response window 620 of the first base station 602 and to transmit the access request 628 according to the determined start time. For example, the first base station 602 uses at least one of a start time of the listening window and length information included the received discovery preamble 624 so that a start time of the response window 620 exists in the listening window 612 of the second base station. Accordingly, in the exemplary embodiment of FIG. 6A, the scanning window 618 and the response window 620 may discontinuously operate in a time axis. At this point, the next scanning window 622 of the scanning window 618, that is, the next scanning window 622 that receives the access confirmation on the access request may continuously operate with the response window 620 in a time axis.

In the description above, the operation between the first base station 600 and the second base station 602 are as follows. In the second base station 600, if the transmission window 606 transmits a discovery preamble, the listening window 608 monitors whether the first base station 602 receives an access request. At this point, if an access request is not received, the next transmission window 610 transmits the discovery preamble 626 again, and the listening window 612 monitors whether the access request is received. If the access request is received (628), the next transmission window 614 transmits an access confirmation to the first base station 602.

Further, the first base station 602 monitors whether the discovery preamble transmitted from the second base station 600 is received at the scanning window 618. At this point, if the discovery preamble is received (632), the first base station 602 transmits an access request to the second base station 600 at the response window 620 (628), and monitors whether an access confirmation transmitted from the second base station 600 at the next scanning window 622. If the access confirmation is received, the neighboring base station detection in the second base station 600 ends.

Referring to FIG. 6B, it illustrates a case where a response window 656 starts to transmit an access request to a second base station 634 right after a first base station 636 receives a discovery preamble at scanning windows 654 and 658. Accordingly, the scanning window 654 and the response window 656 continuously operate in a time axis.

With reference to FIG. 6B, in a neighboring base station detection section 638, the second base station 634 operates transmission windows 640, 644, and 648 and listening windows 642, 646, and 652 in a multiplexing scheme. In order to detect the first base station 636 at the transmission windows 640, 644, and 648, the second base station 634 transmits discovery preambles or transmits an access confirmation to the first base station 636 that has transmitted the access request. Further, the second base station 634 receives an access request for the discovery preamble transmitted by the first base station 636 at the listening windows 642, 646, and 652. At this point, the discovery preamble may include an operator ID of the second base station, a BS ID of the second base station 600, and a beam ID.

The first base station 636 operates the scanning windows 654 and 658 and the response window 656 at the neighboring base station detection section 638. The first base station 636 receives a discovery preamble or receives an access confirmation transmitted by the second base station 634 at the scanning windows 654 and 658. Further, the first base station 636 may transmit an access request for the discovery preamble of the second base station 634 to the second base station 634 at the response window 656.

The scanning window 654 operates until the first base station 636 receives the discovery preamble from the second base station 634, and the response window 656 starts right after the first base station 636 receives the discovery preamble and transmits an access request. For example, according to an exemplary embodiment of FIG. 6B, unlike the exemplary embodiment of FIG. 6A, the first base station 636 continuously operates the scanning window 654 and the response window 656 in the time axis. Accordingly, the start time of the response window 656 may be positioned in the transmission window 644. In the response window 656, one or more access requests may be transmitted to the second base station 634, and in the scanning window 658, the access confirmation transmitted by the second base station 634 is monitored. If the first base station 636 does not know the start time of the transmission window of the second base station 634, the length of transmission window, and the start time and the listening length of the listening window, the response window 656 and the scanning window 658 may operate in a multiplexing scheme, and the length of the response window 656 and the length of the scanning window 658 may be adaptively adjusted by considering time for receiving access confirmation from the second base station 634.

With reference to FIG. 6B, operations between the first base station 636 and the second base station 634 are described as follows. If the transmission window 640 transmits a discovery preamble 660, the second base station 634 monitors whether the listening window 642 receives an access request from the first base station 636. At this point, if the listening window 642 does not receive an access request, the next transmission window 644 transmits the discovery preamble again (662), and monitors whether the listening window 646 receives the access request. If the listening window 646 receives an access request 668, the second base station 634 transmits an access confirmation 664 from the transmission window 648 to the first base station 636.

The first base station 636 monitors whether the scanning window 654 receives the discovery preamble transmitted from the second base station 634. At this point, if the discovery preamble 670 is received, the first base station 636 transmits the access request 666 from the response window 656 to the second base station 634. In order to increase the reception ratio of the access request, the first base station 636 may transmit the access request from the response window 656 to the second base station 634 several times. FIG. 6B illustrates a case where access requests 666 and 668 are transmitted to the second base station 634 two times. In this case, the second base station 634 may receive the first access request 666 at the transmission window 644, and may receive the second access request 668 at the listening window 646 which continues to the transmission window 644 in a time axis. In some cases, both of the first access request 666 and the second access request 668 may be received at the transmission window 644 or the listening window 646.

After transmitting the access request, the first base station 636 monitors the access confirmation 664 transmitted from the second base station 634 at the scanning window 658. If the first base station receives the access confirmation, the neighboring base station detection on the second base station 634 ends.

Referring to FIG. 6C, it illustrates a case where in a neighboring base station detection section 676, a first base station 674 receives discovery preambles after a transmission window and a listening window of a second base station 672 are synchronized with a scanning window and a response window of the first base station 674, and transmits the access request to the second base station 672. Accordingly, the exemplary embodiment of FIG. 6C is different from the exemplary embodiments of FIGS. 6A and 6B in that the discovery preamble transmitted by the second base station to the first base station are a discovery preamble 611 for synchronization and a discovery preamble 603 for detection of the base station. Further, since the first base station 674 synchronizes the transmission window and the listening window of the second base station 672 and the scanning window and the response window of the first base station 674 in advance, the start time of the transmission window and the start time of the scanning window are identical to each other, and the section length of the transmission window and the section length of the scanning window are identical to each other. In the same manner, the start time of the listening window and the start time of the response window are identical to each other and the section length of the listening window and the section length of the response window are identical to each other. Therefore, the exemplary embodiment of FIG. 6C is different from the embodiments of FIGS. 6A and 6B.

With reference to FIG. 6C, in the neighboring base station detection section 676, the second base station 672 operates transmission windows 678, 682, and 686 and listening windows 680, 684, and 688 in a multiplexing manner. The second base station 672 transmits a discovery preamble for detecting the first base station 674 at the transmission windows 678, 682, and 686, and transmits the access confirmation to the first base station 674 that has transmitted the access request. At this point, the discovery preamble may include an operator ID of the second base station, a BS ID of the second base station 672, and a beam ID. The second base station 672 receives the access request transmitted by the first base station 674 at the listening windows 684.

The first base station 674 operates scanning windows 690, 694, and 698 and response windows 692 and 696 in the neighboring base station detection section 676. The first base station 674 receives discovery preambles or access confirmations transmitted by the second base station 672 at the scanning windows 690, 694, and 698. The first base station 674 transmits the access request to the second base station 672 at the response windows 692 and 696.

The first base station 674 synchronizes the transmission window of the second base station 672 and the scanning window of the first base station 674, and the listening window of the second base station 672 and the response window of the first base station 674, and receives the discovery preamble of the second base station 672.

With reference to FIG. 6C, operations between the first base station 674 and the second base station 672 are as follows.

The second base station 672 transmits the discovery preamble 601 at the transmission window 678, and monitors whether the access request transmitted from the first base station 674 is received at the listening window 680. At this point, if the access request is not received, the second base station 672 transmits the discovery preamble 603 again at the next transmission window 682, and monitors whether the access request is received at the listening window 684. If an access request 605 is received at the listening window 684, the second base station 672 transmits the access confirmation to the first base station 674 at the transmission window 686.

If the first base station 674 synchronizes 609 the transmission window and the listening window of the second base station 672 and the scanning window and the response window of the first base station 674, the first base station 674 monitors whether the discovery preamble transmitted from the second base station 672 is received at the scanning window 694. If the first base station 674 receives the discovery preamble 603, the first base station 674 transmits the access request 605 to the second base station 672 at the response window 696, and monitors whether an access confirmation 607 transmitted from the second base station 672 is received at the scanning window 698. If the first base station 674 receives the access confirmation, the neighboring base station detection process with respect to the second base station 672 ends.

Figure 7:
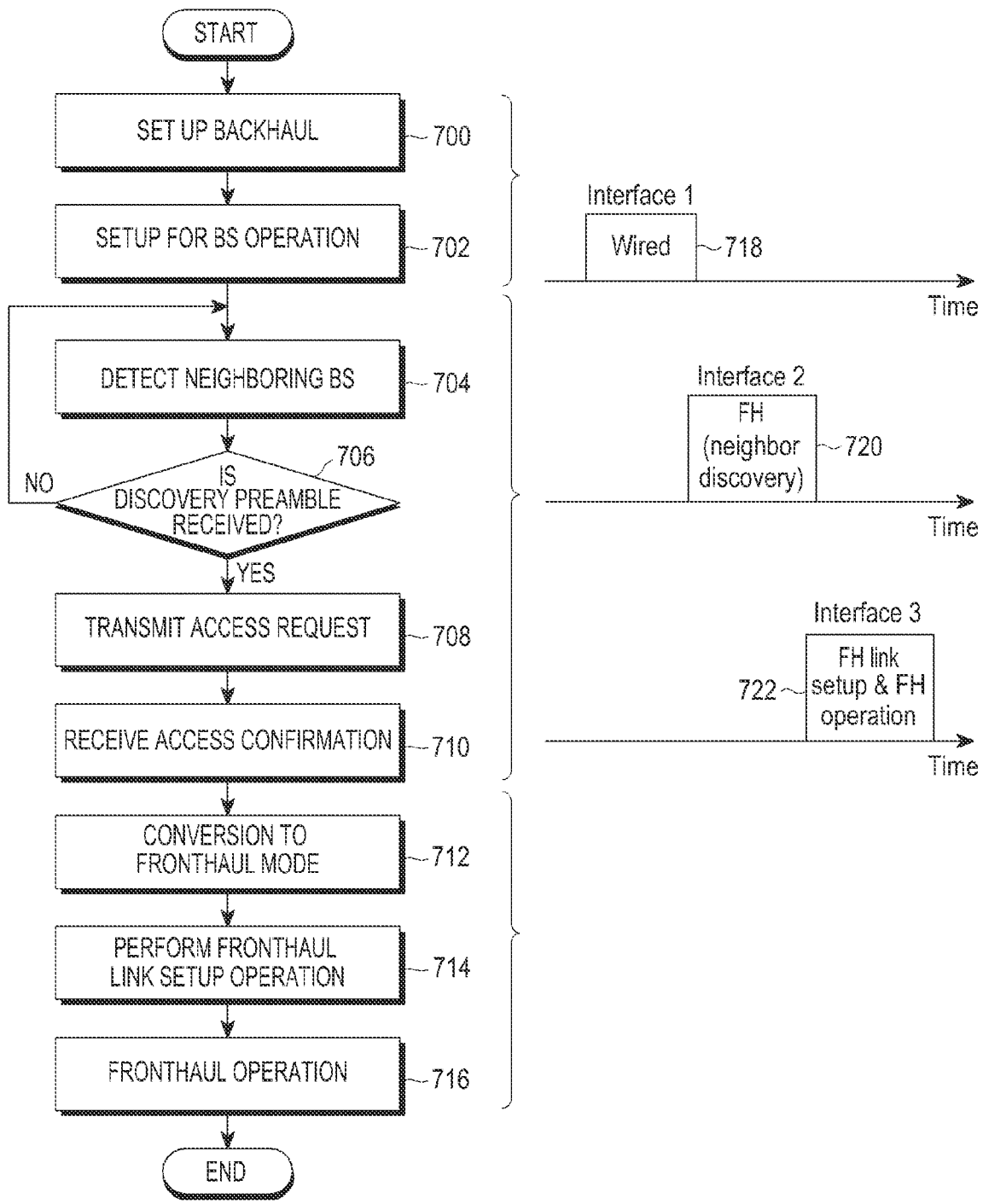
FIG. 7 is a diagram illustrating an interface used when a first base station sets up a fronthaul link with a second base station in a communication system according to an exemplary embodiment of the present invention.

FIG. 7 is a diagram illustrating an interface used when a first base station sets up a fronthaul link with a second base station in a communication system according to an exemplary embodiment of the present invention.

Referring to FIG. 7, a first base station performs a backhaul setup operation in step 700, and sets up a parameter and an environment required for an operation of a base station by performing a communication with an SON server using a setup backhaul link in step 702. A backhaul interface (interface 1, 718) is used in 700 and 702, and the setup backhaul interface corresponds to the wired backhaul interface 718 in step 700.

Thereafter, in step 704, the first base station performs a neighboring base station detection process for setting up a fronthaul link. The neighboring base station detection process starts from an operation of monitoring a discovery preamble transmitted from the second base station. At this point, in the case of a beam forming system, an operation of switching a beam for monitoring a discovery preamble is performed. If the discovery preamble is received in step 706, the first base station transmits an access request in step 708. In the case of a beam forming system, an operation of transmitting an access request several times may be performed, and the access request may include information on an identifier of the first base station, the best beam of the second base station, and the like.

If the first base station receives the access confirmation from the second base station after transmitting the access request in step 710, a neighboring base station detection process between the first base station and the second base station ends. The access confirmation may include information on an identifier of the second base station, an identifier of the first base station, the best beam of the first base station, and the like. The neighboring base station detection process in steps 704 to 710 is performed using an interface 2 720.

Subsequently, if the neighboring base station detection process ends in step 712, the first base station is converted to a fronthaul mode, and may perform the fronthaul link setup operation with the second base station in step 714. The first base station performs a fronthaul link parameter setup operation for setting up a link identifier and an authentication secure key to be used in a fronthaul link with the second base station and an authorization (certification) process between two base stations in step 714. If the fronthaul link setup operation ends, the first base station may perform a fronthaul operation in step 716, and uses an interface 3 722 in steps 712 to 716.

Figure 8:
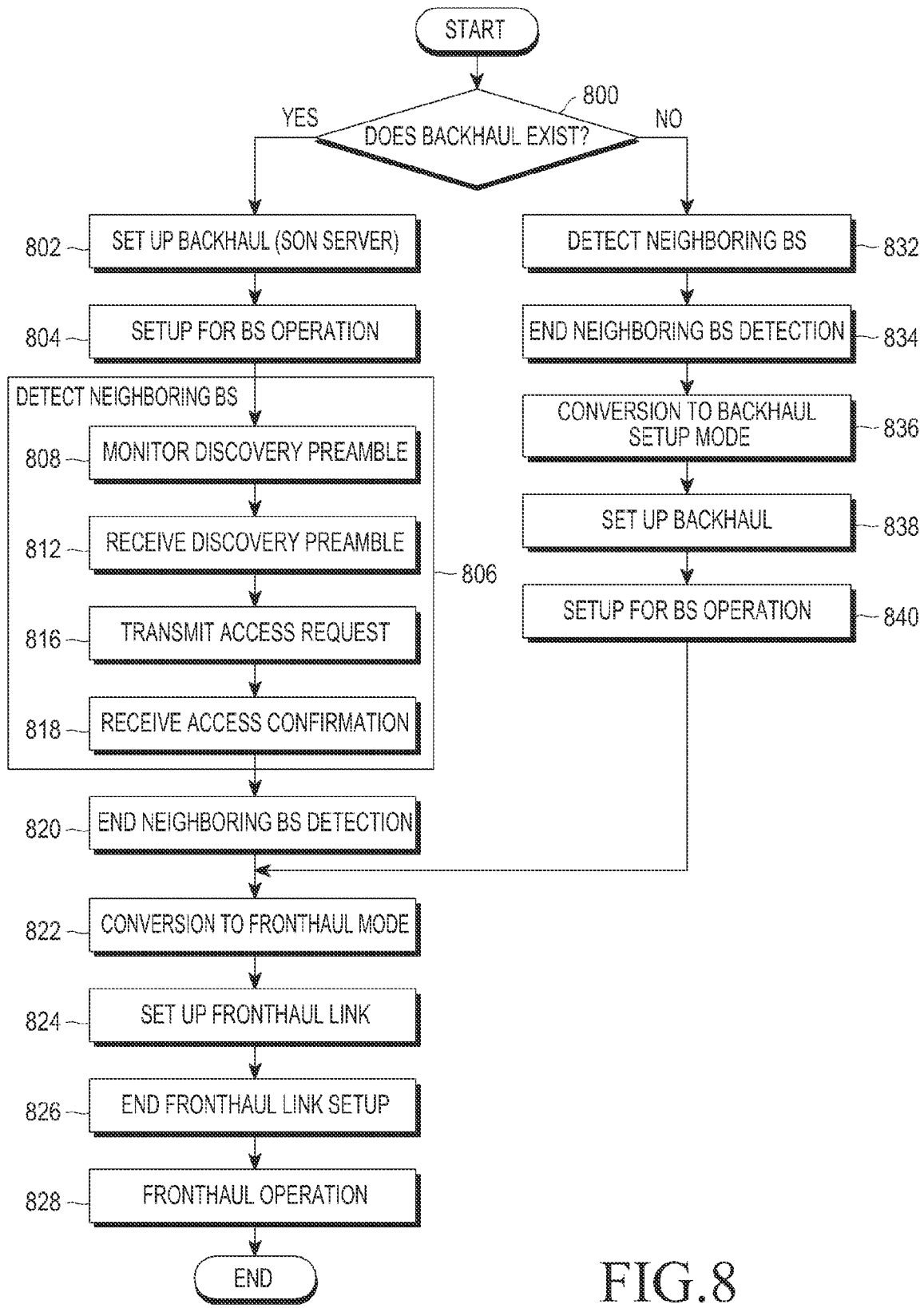
FIG. 8 is diagram illustrating a process in which a first base station sets up a fronthaul link with a second base station in a communication system according to an exemplary embodiment of the present invention.

FIG. 8 is diagram illustrating a process in which a first base station sets up a fronthaul link with a second base station in a communication system according to an exemplary embodiment of the present invention.

Referring to FIG. 8, the first base station determines whether a backhaul link exists in step 800. According to the determination result, if a backhaul link exists (Yes in step 800), the first base station performs a backhaul setup operation with an SON server in step 802, sets up a parameter and an environment required for an operation as a base station in step 804, and performs a neighboring base station detection process in step 806. The neighboring base station detection process in step 806 may include steps 808, 812, 816, and 818. First, the first base station monitors a discovery preamble transmitted from a second base station in step 808. The first base station receives a discovery preamble in step 812. The first base station transmits an access request with respect to the received discovery preamble to the second base station in step 816. At this point, if the discovery preamble includes information on the listening window of the second base station, the first base station stands by until the start time of the listening window and transmits an access request to the second base station at the start time of the listening window. Further, if the discovery preamble does not include information on the listening window, the first base station may transmit an access request right after receiving the discovery preamble. Further, if the transmission window and the listening window of the second base station are synchronized in step 808, the first base station may transmit the access request according to the synchronization.

If the first base station receives the access confirmation from the second base station after the first base station transmits the access request to the second base station in step 818, the first base station ends the detection process of the second base station, which is a neighboring base station in step 820. Subsequently, the first base station performs conversion into a fronthaul mode in step 822, and sets up a fronthaul link parameter with a second base station in step 824. The fronthaul link setup process may include an operation of setting up a parameter of a link identifier and an authentication secure key to be used in the fronthaul link with the second base station, and an authorization (certification) process with respect to two base stations. If the fronthaul link is set up, the first base station ends the fronthaul link setup operation in step 826, and performs the fronthaul operation in step 828.

Meanwhile, if the first base station does not have the backhaul link (No in step 800), the first base station performs the neighboring base station detection in step 832, as performed in step 806. If the neighboring base station detection process ends in step 834, the first base station performs conversion to a backhaul setup mode in step 836. The first base station performs a backhaul link setup to the SON server by performing a communication with the SON server through the second base station in step 838, and sets up a parameter and an environment required for an operation as a base station in step 840. Thereafter, the first base station proceeds to step 822 to perform conversion to the fronthaul mode and performs a fronthaul link setup process with the second base station.

Figure 9:
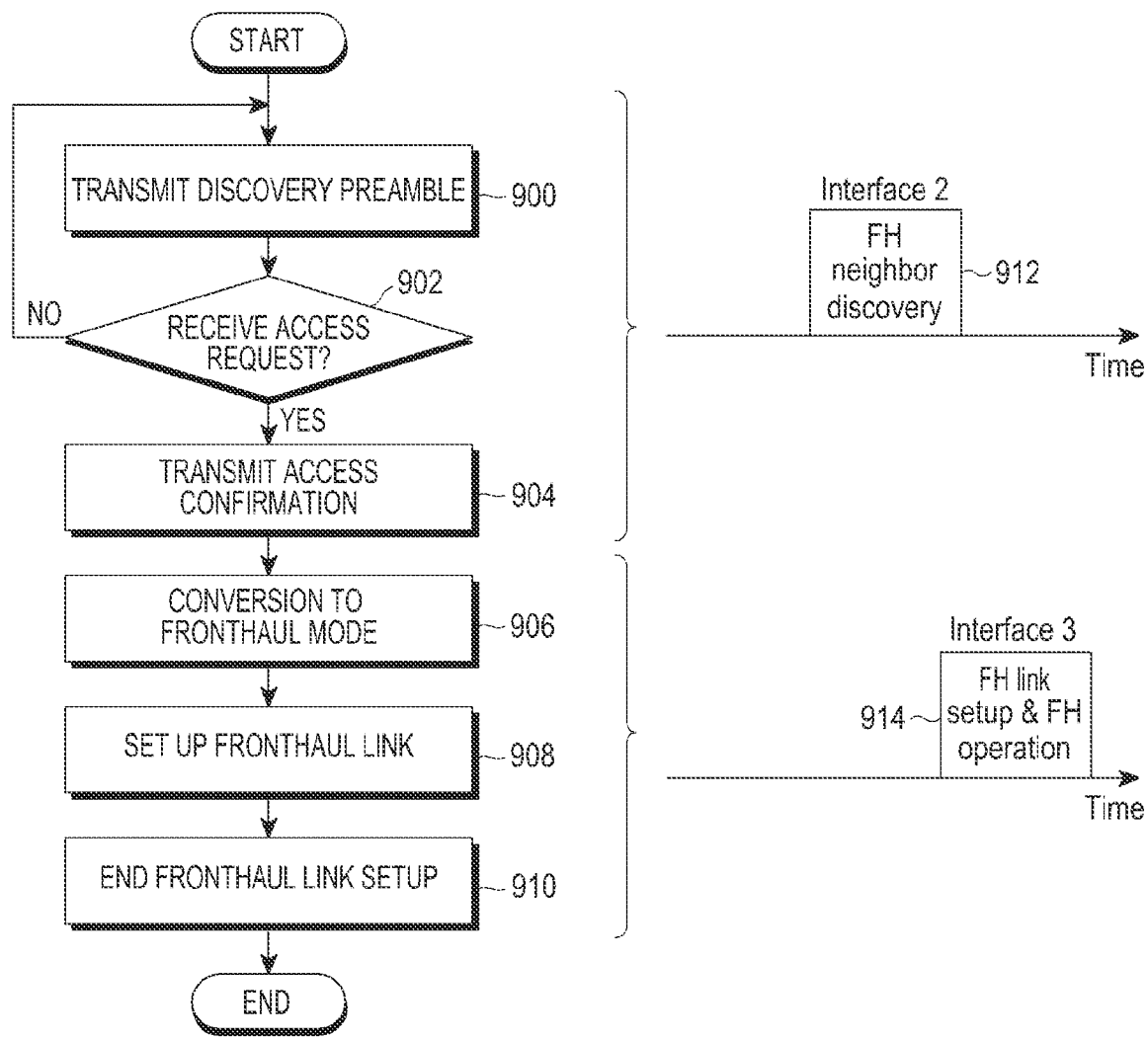
FIG. 9 is a flowchart illustrating an interface used when a second base station sets up a fronthaul link with the first base station in a communication system according to an exemplary embodiment of the present invention.

FIG. 9 is a flowchart illustrating an interface used when a second base station sets up a fronthaul link with the first base station in a communication system according to an exemplary embodiment of the present invention.

Referring to FIG. 9, the second base station transmits a discovery preamble in a transmission section in order to perform a neighboring base station detection process in step 900, and monitors whether the first base station receives an access request in step 902. In a beam forming system, the second base station may transmit the discovery preamble several times in different directions, and may perform a beam switching process in order to receive an access request. If the access request is received (Yes in step 902), the second base station transmits the access confirmation to the first base station in step 904, and ends the neighboring base station detection process. At this point, the neighboring base station detection process in steps 900, 902, and 904 may be performed by using an interface 2 912.

Thereafter, the second base station performs conversion to a fronthaul mode in step 906, and performs a fronthaul link setup process with the first base station in step 908. Subsequently, the second base station ends the fronthaul link setup in step 910, and performs a fronthaul operation. At this point, the fronthaul link setup process in step 908 includes an operation of setting up a parameter of a link identifier and an authentication secure key to be used in the fronthaul link with the first base station and an authorization process with respect to two base stations. The fronthaul mode in steps 906, 908, and 910 is performed by using an interface 3 914.

Figure 10:
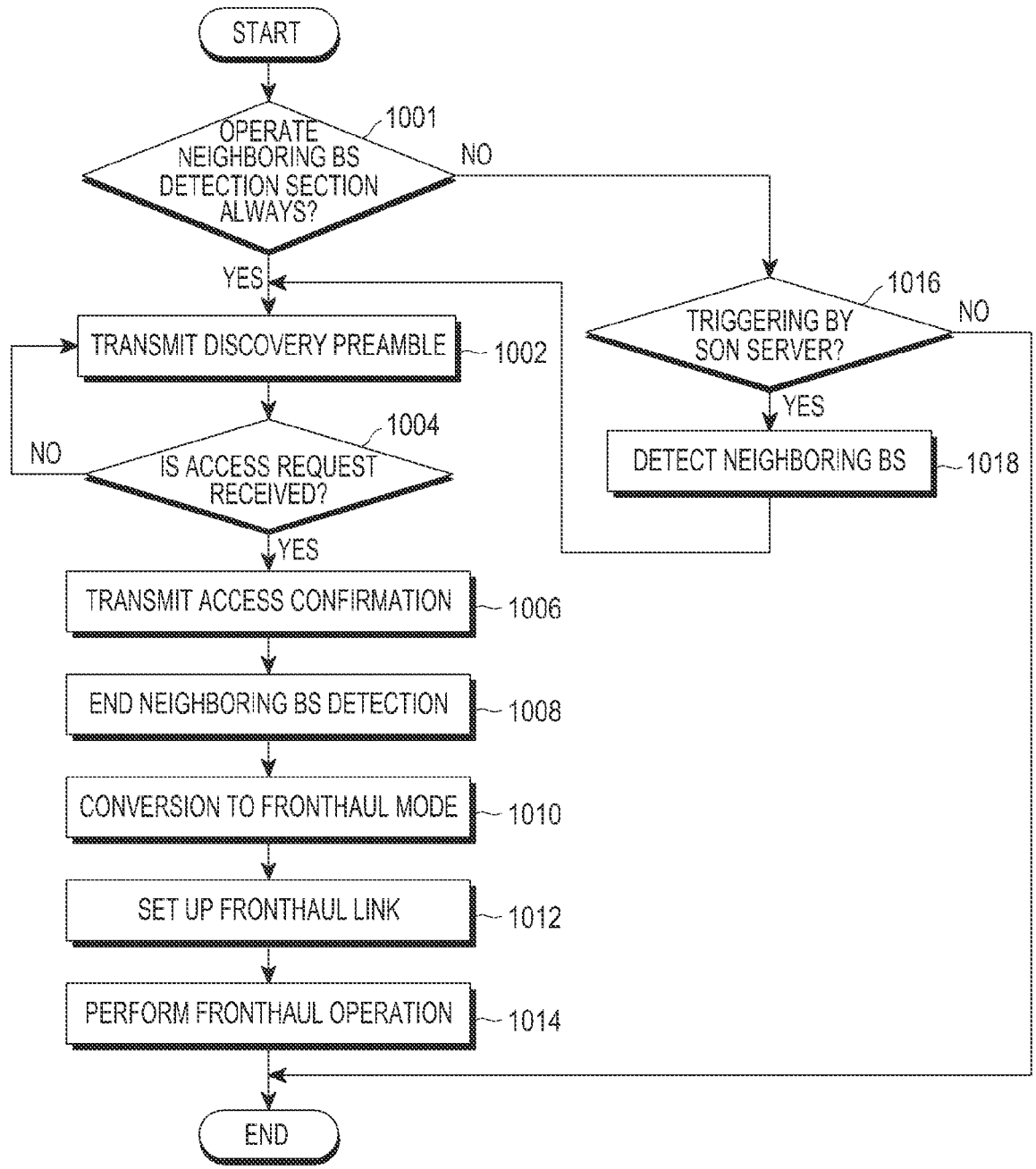
FIG. 10 is a flowchart illustrating a process in which a second base station sets up a fronthaul link with a first base station in a communication system according to an exemplary embodiment of the present invention.

FIG. 10 is a flowchart illustrating a process in which a second base station sets up a fronthaul link with a first base station in a communication system according to an exemplary embodiment of the present invention.

Referring to FIG. 10, the second base station always operates the neighboring base station detection section in step 1001, or operates the neighboring base station detection section only when being triggered by an SON server in step 1016.

First, when the second base station always operates the neighboring base station detection section (Yes in step 1001), the second base station transmits a discovery preamble to the first base station through a transmission window in a neighboring base station detection section and monitors whether the first base station receives an access request in step 1002. The second base station determines whether the access request is received in step 1004. If the access request is received, the second base station transmits an access confirmation to the first base station in step 1006, and ends the neighboring base station detection process with the first base station in step 1008. Thereafter, the second base station performs conversion to a fronthaul mode in step 1010, sets up a parameter required for a fronthaul link with the first base station in step 1012, and performs a fronthaul operation in step 1014. At this point, the parameter required for the fronthaul link may include a fronthaul link identifier and an authentication secure key. The fronthaul link setup process may include an operation of setting up a parameter of a link identifier and a secure key to be used in a fronthaul link with the first base station and an authorization (certification) process with respect to two base stations.

Meanwhile, if the neighboring base station detection section is triggered by the SON server (Yes in step 1016), the second base station receives a request of transmitting a discovery preamble from the SON server in step 1018, and proceeds to step 1002.

Figure 11:
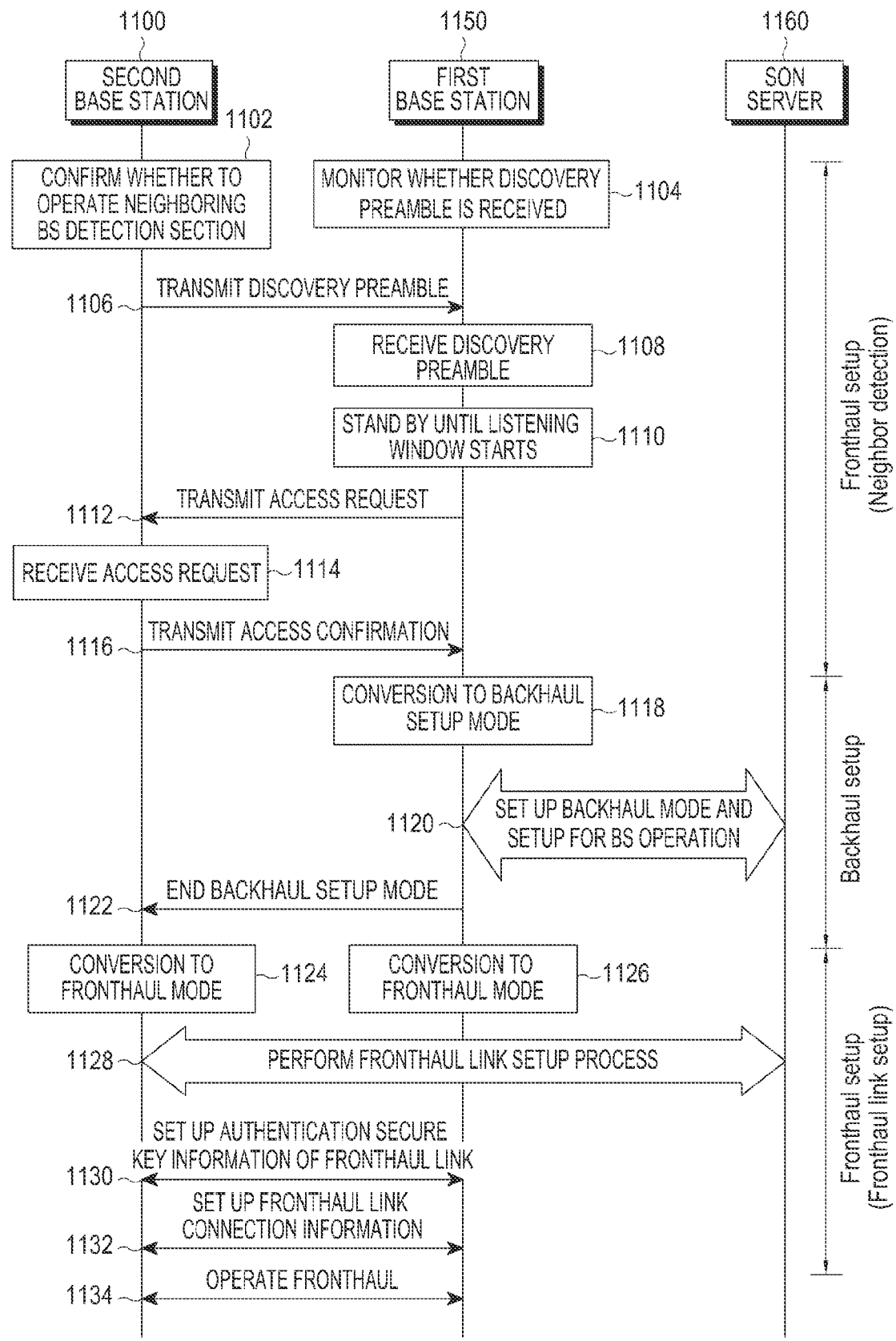
FIG. 11 is a sequence diagram illustrating a process of setting up fronthaul and backhaul links among a first base station, a second base station, and a Self Organizing Network (SON) server in a communication system according to an exemplary embodiment of the present invention.

FIG. 11 is a sequence diagram illustrating a process of setting up fronthaul and backhaul links among a first base station, a second base station, and an SON server in a communication system according to an exemplary embodiment of the present invention.

Referring to FIG. 11, a second BS 1100 confirms whether to operate a neighboring base station detection section in step 1102, and transmits a discovery preamble to the first base station in step 1106. At this point, the discovery preamble may include information on the start time and the length of the listening window of the second base station. A first BS 1150 monitors whether a discovery preamble is to be received from the second BS 1100 in step 1104, and receives the discovery preamble in step 1108. The first BS 1150 may select the best beam of the second BS 1100 in step 1108.

If the discovery preamble includes the start time and the length of the listening window of the second base station, the first BS 1150 stands by until the listening window of the second BS 1100 starts in step 1110, and the first BS 1150 starts the response window and transmits the access request when the listening window of the second BS 1100 starts in step 1112. At this point, the access request may include an indicator informing that the first BS 1150 does not have a backhaul link and the information on the best beam selected in step 1108. Further, the first base station may directly transmit the access request without going through step 1110, or transmit the access request according to the synchronization between the first base station and the second base station.

If the second BS 1100 receives an access request of the first BS 1150 in step 1114, the second BS 1100 acquires the information on the best beam of the second base station from the access request, selects the best beam of the first BS 1150, and transmits an access confirmation to the first BS 1150 in step 1116. The access confirmation may include information on the best beam of the first BS 1150. If the second BS 1100 transmits an access confirmation to the first BS 1150, the second BS 1100 and the first BS 1150 end the neighboring base station detection process, and the first BS 1150 performs conversion to a backhaul setup mode in step 1118.

If the first BS 1150 performs the conversion to the backhaul link setup mode, the first BS 1150 performs a process of setting up a backhaul link with an SON server 1160 and setting up a parameter and an environment required for an operation as a base station in step 1120. The first BS 1150 may set up a backhaul link with the SON server 1160 through the second BS 1100, and the parameter required for an operation as a base station may include an access preamble, a fronthaul link preamble, and an authentication information.

If a backhaul link is set up, the first BS 1150 informs the second BS 1100 of the end of the backhaul setup mode in step 1122. The first BS 1150 and the second BS 1100 perform conversion to a fronthaul mode in steps 1124 and 1126, and starts a fronthaul link setup process in step 1128. The second BS 1100 and the first BS 1150 may acquire information required for setting up a fronthaul link from the SON server 1160 in step 1128, and sets up an authorization (certification) with respect to two base stations and information on an authentication secure key of the fronthaul link in step 1130. Further, the first BS 1150 and the second BS 1100 set up fronthaul link connection information including a link identifier in step 1132, complete a fronthaul link setup process between two base stations in step 1134, and perform a fronthaul operation.

Figure 12:
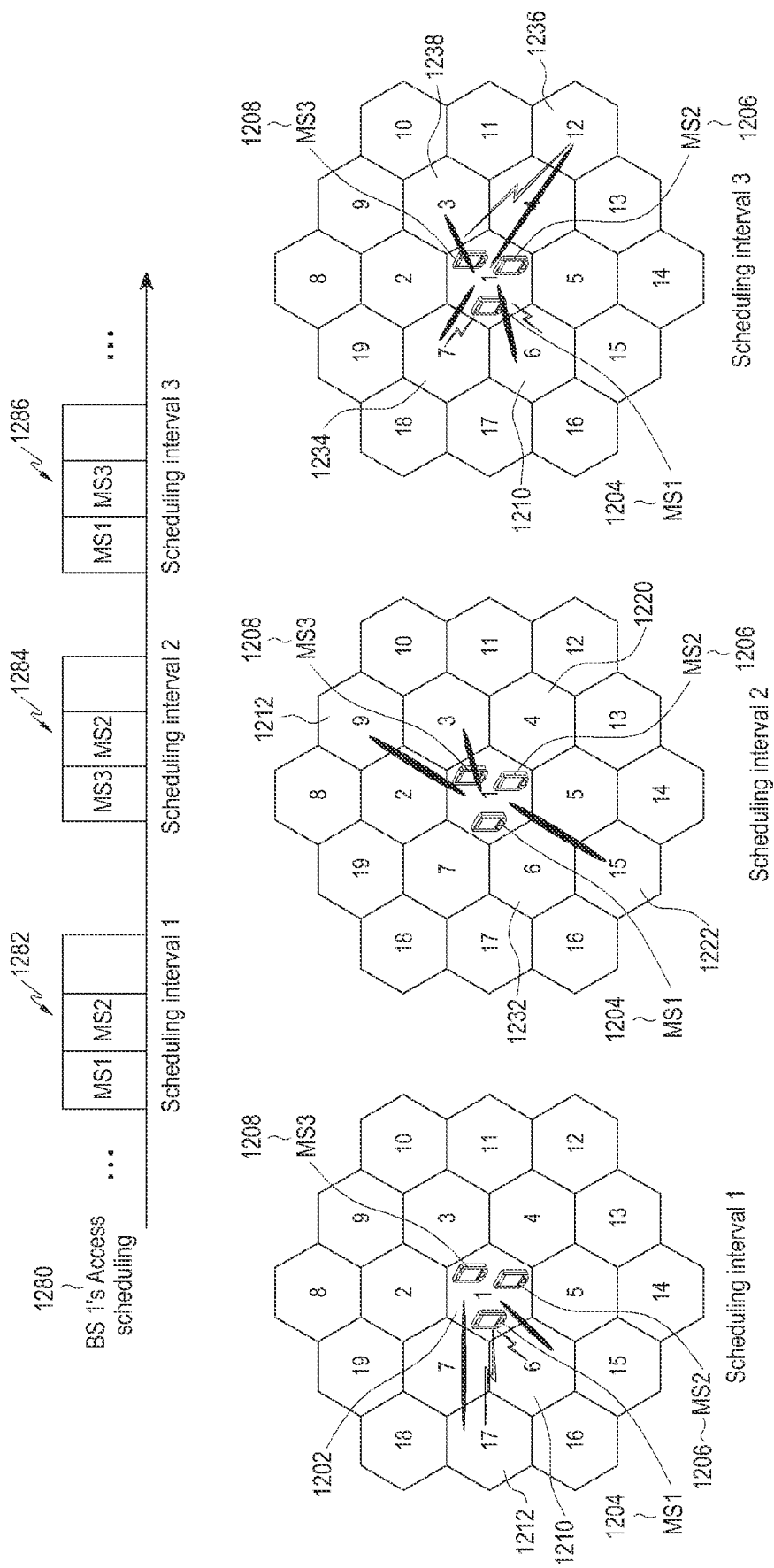
FIG. 12 is a diagram illustrating a base station connection in a dynamic multiplexing scheme using a fronthaul link in a communication system according to an exemplary embodiment of the present invention.

FIG. 12 is a diagram illustrating a base station connection in a dynamic multiplexing scheme using a fronthaul link in a communication system according to an exemplary embodiment of the present invention.

Referring to FIG. 12, a fronthaul connection among BS1 to BS19 that services an MS1 1204, an MS2 1206, and an MS3 1208 positioned in the same cell with the BS1 1202 is dynamically adaptively used according to a scheduling interval 1 1282, a scheduling interval 2 1284, and a scheduling interval 3 1286 of access link scheduling 1280 of the BS1 1202. For example, the fronthaul connection among the base stations is used with an access link with respect to the MS only when a communication among multiple base stations servicing the same MS is required.

In the scheduling interval 1 1282, the BS1 1202 performs a fronthaul communication with a BS17 1212 and a BS6 1210 in order to service the MS1 1204 and the MS3 1208. In a next scheduling interval 2 1284, the BS1 1202 performs a fronthaul communication with a BS4 1220, a BS6 1232, a BS9 1212, and a BS15 1222 in order to service the MS2 1206 and the MS3 1208. In a next scheduling interval 3 1286, in order to service the MS1 1204 and the MS3 1208, the BS1 1202 performs a fronthaul communication with a BS3 1238, the BS6 1210, a BS7 1234, and a BS12 1236.

In FIG. 12, the BS1 1202 in the same cell with the MS1 1204, the MS2 1206, and the MS3 1208 maintains a point-to-multipoint connection with the BS6 1210, the BS17 1212, the BS15 1222, the BS9 1224, the BS4 1220, the BS12 1236, the BS3 1238, and the BS7 1234 that service the MSs together through fronthaul link/communication. Further, each of the base stations may perform a communication by applying a multiplexing scheme among an access link that services an MS, a fronthaul link that performs a communication with a neighboring base station, and a backhaul link that is connected to obtain backhaul link information required for a communication between an MS and a neighboring base station.

Figure 13:
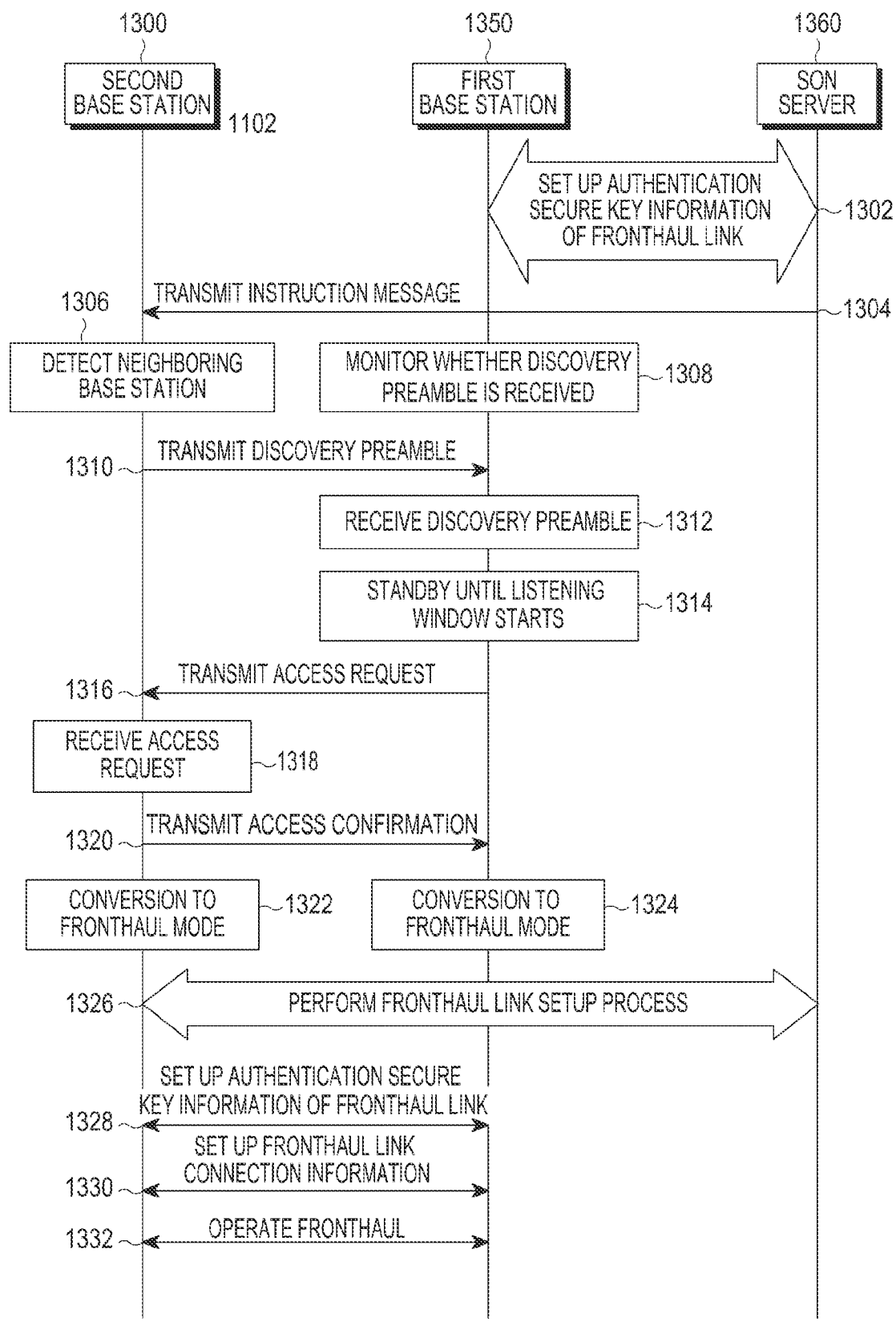
FIG. 13 is a sequence diagram illustrating a signal sequence among a first base station, a second base station, and an SON server when a fronthaul link is set up by the instruction of the SON server in a communication system according to an exemplary embodiment of the present invention.

FIG. 13 is a sequence diagram illustrating a signal sequence among a first base station, a second base station, and an SON server when a fronthaul link is set up according to the instruction of the SON server in a communication system according to an exemplary embodiment of the present invention.

Referring to FIG. 13, a first base station 1350 sets up a parameter and an environment for an operation as a base station by setting a backhaul link and being connected to an SON server 1360 in step 1302. The parameter for performing a base station operation may include an access preamble and a fronthaul preamble.

If a process of setting up a backhaul link and a base station parameter is completed, the SON server 1360 transmits an instruction message informing the second base station near the first base station 1350 that the first base station 1350 exists in step 1304. Accordingly, if a second base station 1300 recognizes the existence of the first base station 1350, the second base station 1300 starts a neighboring base station detection process with the first base station 1350 in step 1306. For example, the first base station 1350 starts a neighboring base station detection process, monitors the reception of a discovery preamble from the second base station 1300 in step 1308, and transmits the discovery preamble in step 1310. At this point, the discovery preamble may include information on an offset with respect to the listening section of the second base station 1300 and the listening section length.

If the first base station 1350 receives the discovery preamble in step 1312, the first base station 1350 may select information on the best beam of the second base station 1300. Further, if the discovery preamble includes information on the second base station 1300, the first base station 1350 stands by until the start time of the listening window in step 1314 and transmits an access request in step 1316. Herein, the access request may include information on the best beam of the second base station and information on the fronthaul preamble of the first base station 1350.

If the second base station 1300 receives an access request in step 1318, the second base station 1300 may acquire information on the best beam selected by the first base station 1350 and may select information on the best beam of the first base station. The second base station 1300 transmits the access confirmation to the first base station 1350 in step 1320. At this point, the access confirmation may include the best beam information of the first base station 1350 and the fronthaul preamble information of the second base station 1300. Thereafter, the second base station 1300 and the first base station 1350 perform conversion to a fronthaul mode in steps 1322 and 1324, respectively.

Thereafter, the second base station 1300 and the first base station 1350 perform a fronthaul link setup process in step 1326. At this point, the second base station 1300 and the first base station 1350 may acquire information required for the fronthaul link setup from the SON server 1360. In addition, the second base station 1300 and the first base station 1350 perform a process for setting a safe fronthaul link, and set up an authorization (certification) with respect to two base stations and authentication secure key information in step 1328. Further, the two base stations set up fronthaul link connection information including link identifiers in step 1330, complete the fronthaul link setup process between the two base stations, and perform the fronthaul operation in step 1332.

Meanwhile, the two base stations that set up the fronthaul link are to periodically perform a beam tracking process in order to maintain the best beam, and the beam tracking process is performed at the fronthaul interface that perform the fronthaul operation. Otherwise, if the base station recognizes that the best beam with the other base station that has set up the fronthaul link may not be maintained, the base station informs the fact to the SON server and may perform a beam tracking process with the other base station with the aid of the SON server.

Figure 14:
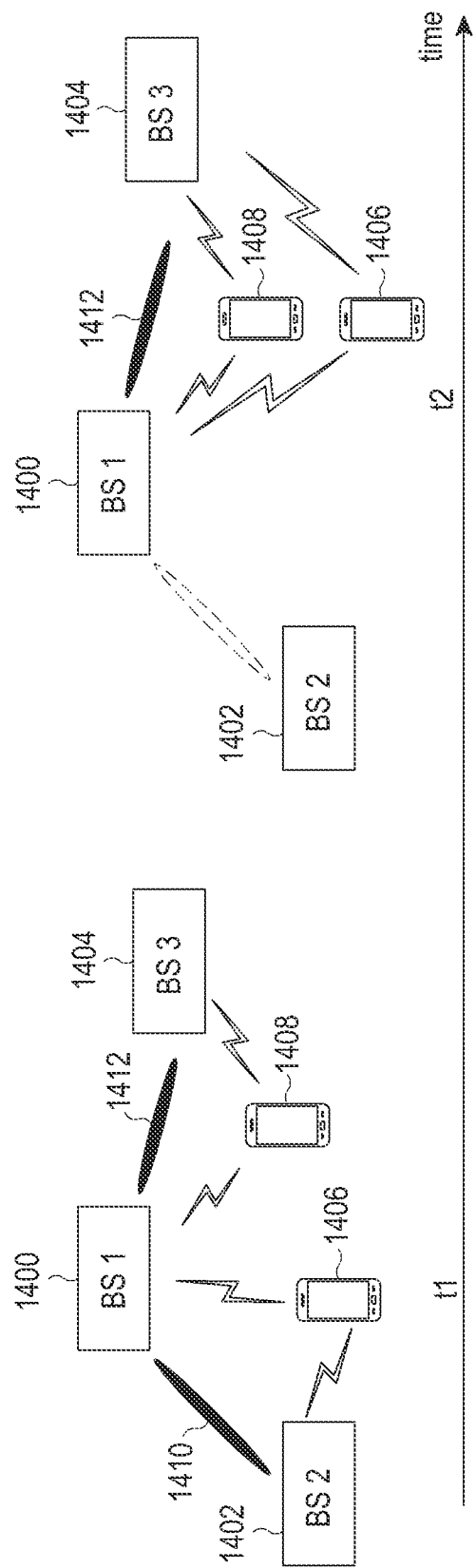
FIG. 14 is a diagram illustrating a case where a fronthaul link is temporarily released in a communication system according to an exemplary embodiment of the present invention.

FIG. 14 is a diagram illustrating a case where a fronthaul link is temporarily released in a communication system according to an exemplary embodiment of the present invention.

Referring to FIG. 14, at time t1, a BS1 1400 and a BS2 1402 service an MS1 1406, and the BS1 1400 and a BS3 1404 service an MS2 1408. The BS1 1400 and the BS2 1402 exchange data to be transmitted to the MS1 1406, control information for data transmission, and scheduling information through a fronthaul link 1410. Further, the BS1 1400 and the BS3 1404 exchange data to be transmitted to the MS2 1408, control information for data transmission, and scheduling information through a fronthaul link 1412.

Thereafter, if the MS1 1406 moves at time t2, and does not receive a service from the BS2 1402, but receives a service from the BS3 1404, the BS1 1400 and the BS3 1404 exchange data for servicing the MS2 1408 and the MS1 1406, control information, and scheduling information through the fronthaul link 1412. At this point, if an MS which the BS1 1400 and the BS2 1402 service together does not exist, the BS1 1400 and the BS2 1402 may release the fronthaul link 1410 until an MS which the two base stations service together exists. Further, the other base station that does not have an MS to service together may release the fronthaul link with neighboring base stations and may transition to a dormant mode. The release of the fronthaul link may be applied to the time section in a micro level or the time section in a macro level.

If the base station desires to connect back to the link after the release of the fronthaul link or the base station that has transitioned to the dormant mode desires to connect back to the fronthaul link with the neighboring base station, the operations of FIGS. 7 to 13 may be performed.

Figure 15:
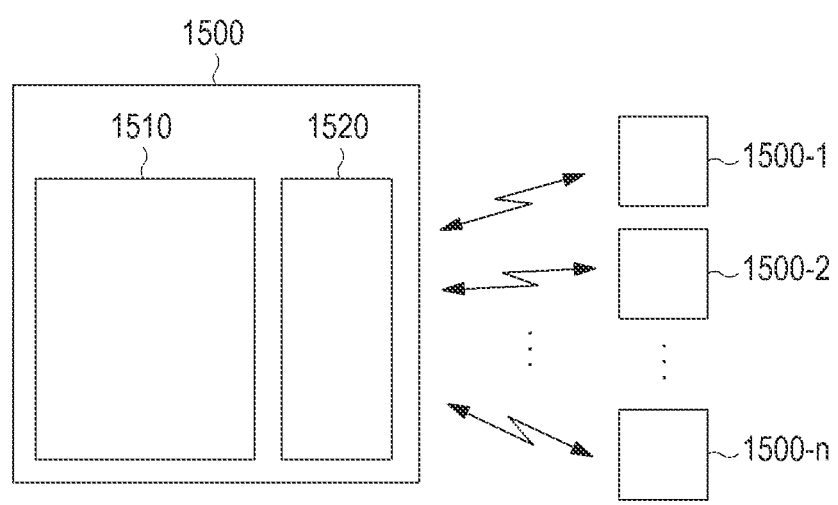
FIG. 15 is a diagram illustrating an interior configuration of a base station according to an exemplary embodiment of the present invention.

FIG. 15 is a diagram illustrating an interior configuration of a base station according to an exemplary embodiment of the present invention.

Referring to FIG. 15, the base station may include a base station 1500 and a plurality of neighboring base stations 1500-1 to 1500-n. Each of the base stations may have the same configuration and may perform the same function. Accordingly, the configuration and the function of the base station 1500 are described as follows and the descriptions of neighboring base stations 1500-1 to 1500-n will not be provided.

The base station 1500 may include a controller 1510 and a communication unit 1520.

The controller 1510 controls the communication unit 1520 and determines a scanning window section, a response window section, and a next scanning window section. Accordingly, the controller 1510 receives discovery preambles transmitted from neighboring base stations 1500-1 to 1500-n through the communication unit 1520. The controller 1510 determines the start time of a response window section corresponding to each of the listening window sections by using section information on each of the listening window sections of the neighboring base stations included in the transmitted discovery preambles. Further, the controller 1510 may determine a response window section to transmit a discovery preamble to a neighboring base station in the response window section according to the determined start time, and control the next scanning window section to receive an access confirmation with respect to the access request transmitted from the neighboring base station. It is obvious that the controller 1510 can be implemented to perform functional characteristics described in the exemplary embodiments of FIGS. 6A through 6C.

The communication unit 1520 may receive a discovery preamble from the neighboring base station under the control of the controller 1510 in the scanning window section, transmit the access request with respect to the discovery preamble to the neighboring base station in the response window section, and receive the access confirmation with respect to the access request in a scanning window section next to the scanning window section.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of detecting a neighboring base station by a base station in a communication system, the method comprising:
   receiving a discovery preamble transmitted from a transmission window section of the neighboring base station in a scanning window section;
   determining a start time of a response window section corresponding to a listening window section using at least one of section information on the listening window section of the neighboring base station included in the received discovery preamble, a start time of the transmission window section of the neighboring base station included in the section information, and a section length of the transmission window section;
   transmitting an access request with respect to the received discovery preamble from the response window section to the neighboring base station according to the determined start time; and
   receiving an access confirmation with respect to the access request transmitted from the neighboring base station,
   wherein the section information on the listening window section includes a start time of the listening window section and a section length of the listening window section.

2. The method of claim 1, wherein the scanning window section and the response window section are discontinuous in a time axis.

3. The method of 1, wherein the start time of the response window section exists in the listening window section.

4. The method of claim 1, wherein the scanning window section and the response window section are continuous in a time axis.

5. The method of claim 1, wherein the start time of the response window section exists in the transmission window section.

6. The method of claim 1, wherein the response window section overlaps with a partial section of the transmission window section and a partial section of the listening window section with respect to a time axis.

7. The method of claim 6, wherein the base station transmits the access request in the response window section at least twice.

8. The method of claim 1, wherein the start time of the response window section is the start time of the listening window section, wherein a section length of the response window section is identical to the section length of the listening window section, wherein a start time of the scanning window is identical to the start time of the transmission window section, and wherein a section length of the scanning window section is identical to the section length of the transmission window section.

9. A base station for detecting a neighboring base station in a communication system, the base station comprising:
   a communication unit configured to:
      receive a discovery preamble from the neighboring base station in a scanning window section,
      transmit an access request with respect to the discovery preamble from a response window section to the neighboring base station, and
      receive an access confirmation with respect to the access request in a scanning window section next to the scanning window section; and
   a controller configured to determine the scanning window section, the response window section, and the next scanning window section by controlling the communication unit,
   wherein the controller determines a start time of a response window section corresponding to a listening window section using at least one of section information on the listening window section of the neighboring base station included in the received discovery preamble, a start time of the transmission window section of the neighboring base station included in the section information, and a section length of the transmission window section, determines the response window section to transmit the discovery preamble to the neighboring base station from the response window section according to the determined start time, and controls the scanning window section to receive an access confirmation with respect to the access request transmitted from the neighboring base station, wherein the section information on the listening window section includes a start time of the listening window section and a section length of the listening window section.

10. The base station of claim 9, wherein the scanning window section and the response window section are discontinuous in a time axis.

11. The base station of claim 9, wherein the controller performs a control so that the start time of the response window section exists in the listening window section.

12. The base station of claim 9, wherein the scanning window section and the response window section are continuous in a time axis.

13. The base station of claim 9, wherein the controller performs a control so that the start time of the response window section exists in the transmission window section.

14. The base station of claim 9, wherein the controller performs a control so that the response window section overlaps with a partial section of the transmission window section and a partial section of the listening window section with respect to a time axis.

15. The base station of claim 14, wherein the controller controls the communication unit to transmit the access request in the response window section at least twice.

16. The base station of claim 9, wherein the controller synchronizes the start time of the response window section and a start time of the listening window section, performs a control so that a section length of the response window section is identical to a section length of the listening window section, synchronizes a start time of the scanning window and a start time of the transmission window section, performs a control so that a section length of the scanning window section is identical to a section length of the transmission window section.

* * * * *